US010740724B2

United States Patent
Vesely et al.

(10) Patent No.: US 10,740,724 B2
(45) Date of Patent: *Aug. 11, 2020

(54) METHODS OF ANALYZING KEY ENTITIES IN A SOCIAL NETWORK

(71) Applicant: LNX RESEARCH, LLC, Garden Grove, CA (US)

(72) Inventors: Daniel Vesely, Garden Grove, CA (US); Anthony M. Page, Garden Grove, CA (US); Ryan Peeler, Santa Ana, CA (US)

(73) Assignee: LNX RESEARCH, LLC, Garden Grove, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/039,146

(22) Filed: Jul. 18, 2018

(65) Prior Publication Data

US 2018/0322456 A1 Nov. 8, 2018

Related U.S. Application Data

(63) Continuation-in-part of application No. 15/148,952, filed on May 6, 2016, now abandoned, which is a continuation-in-part of application No. 14/949,555, filed on Nov. 23, 2015, now abandoned, which is a continuation of application No. 12/877,914, filed on Sep. 8, 2010, now Pat. No. 9,195,962.

(60) Provisional application No. 61/241,801, filed on Sep. 11, 2009.

(51) Int. Cl.
*H04L 12/58* (2006.01)
*G06Q 10/10* (2012.01)
*G06Q 30/02* (2012.01)

(52) U.S. Cl.
CPC ............. *G06Q 10/10* (2013.01); *G06Q 30/02* (2013.01)

(58) Field of Classification Search
CPC ....... H04L 45/123; H04L 51/32; H04L 67/22; G06Q 50/01
USPC .................................. 709/204, 206; 707/737
See application file for complete search history.

(56) References Cited

U.S. PATENT DOCUMENTS

| 9,195,962 B2 | 11/2015 | Topham et al. |
| 2006/0106847 A1 | 5/2006 | Eckardt et al. |
| 2006/0143081 A1 | 6/2006 | Argaiz |
| 2007/0067271 A1 | 3/2007 | Lu |
| 2007/0226248 A1* | 9/2007 | Darr ....................... G06Q 10/10 |

(Continued)

OTHER PUBLICATIONS

Jamali et al.,"Different Aspects of Social Network Analysis," 2006 IEEE/WIC/ACM International Conference on Web Intelligence, WI 2006 Main Conference Proceedings, Hong Kong, Dec. 2006, pp. 66-72 (Year: 2006).*

(Continued)

*Primary Examiner* — Suraj M Joshi
*Assistant Examiner* — Sherman Lin
(74) *Attorney, Agent, or Firm* — Nguyen Tarbet

(57) ABSTRACT

Methods of identifying key entities in a network, building a subgraph, or invisible college, of these key entities, segmenting the subgraph of key entities into specific sub-groups based upon their roles in the network, identifying bridge builders between sub-groups, identifying work-circles of frequently collaborative entities, and identifying institutions, which are centers of significance, are disclosed. These techniques can be used as an alternative to the survey method for finding key opinion leaders.

2 Claims, 13 Drawing Sheets

(56) References Cited

U.S. PATENT DOCUMENTS

2007/0288602 A1  12/2007  Sundaresan
2009/0132652 A1   5/2009  Athale et al.
2010/0008310 A1   1/2010  Bonchi
2011/0004501 A1   1/2011  Pradhan

OTHER PUBLICATIONS

Tang, Jie et al., "Amet Miner: extraction and mining of academic social network." In Proceedings of the 14th ACM SIGKDD international conference on Knowledge discovery and data mining, pp. 990-998. ACM, Aug. 2008.

Nooraie et al. (Association between co-authorship network and scientific productivity and impact indicators in academic medical research centers: A case study in Iran, Health Research Policy and Systems, 2008, 6:9, published Sep. 16, 2008).

\* cited by examiner

| Entity | Betweeness Centrality | Rank Score | Eigenvector Centrality | Rank Score |
|---|---|---|---|---|
| 301 | 16 | 9 | 0.077549 | 15 |
| 302 | 0 | 13 | 0.0291554 | 17 |
| 303 | 0 | 13 | 0.0279512 | 18 |
| 304 | 9.035714286 | 10 | 0.1922962 | 10 |
| 305 | 30 | 4 | 0.3744081 | 5 |
| 306 | 16.59393939 | 7 | 0.4277099 | 4 |
| 307 | 0 | 13 | 0.0583107 | 16 |
| 308 | 0 | 13 | 0.3604326 | 6 |
| 309 | 0 | 13 | 0.3604326 | 6 |
| 310 | 8.141666667 | 11 | 0.1866572 | 11 |
| 311 | 5.547727273 | 12 | 0.0901601 | 14 |
| 312 | 0 | 13 | 0.3604326 | 6 |
| 313 | 30.60075758 | 3 | 0.4526252 | 2 |
| 314 | 16.29891775 | 8 | 0.1269741 | 13 |
| 315 | 36.38614719 | 2 | 0.1617798 | 12 |
| 316 | 17.5 | 6 | 0.2163255 | 9 |
| 317 | 22.87142857 | 5 | 0.4384033 | 3 |
| 318 | 92.0237013 | 1 | 1 | 1 |

FIG. 4

| Entity | Betweeness Centrality | Rank Score | Eigenvector Centrality | Rank Score | Combined Reach |
|---|---|---|---|---|---|
| 113 | 30.60075758 | 3 | 0.4526252 | 2 | 72% |
| 115 | 36.38614719 | 2 | 0.1617798 | 12 | |
| 117 | 22.87142857 | 5 | 0.4384033 | 3 | |
| 118 | 92.0237013 | 1 | 1 | 1 | |

FIG. 5

| Entity | Betweeness Centrality | Rank Score | Eigenvector Centrality | Rank Score | Combined Reach |
|---|---|---|---|---|---|
| 105 | 30 | 4 | 0.3744081 | 5 | 83% |
| 106 | 16.59393939 | 7 | 0.4277099 | 4 | |
| 113 | 30.60075758 | 3 | 0.4526252 | 2 | |
| 115 | 36.38614719 | 2 | 0.1617798 | 12 | |
| 117 | 22.87142857 | 5 | 0.4384033 | 3 | |
| 118 | 92.0237013 | 1 | 1 | 1 | |

FIG. 6

| ENTITY |
| --- |
| 701 |
| 702 |
| 703 |
| 704 |
| 705 |
| 706 |
| 707 |
| 708 |
| 709 |
| 710 |
| 711 |
| 712 |
| 713 |
| 714 |
| 715 |
| 716 |
| 717 |
| 718 |
| 719 |
| 720 |
| 721 |
| 722 |
| 723 |

FIG. 7

| ENTITY | EIGENVECTOR | RANK | CLOSENESS | RANK |
|---|---|---|---|---|
| 701 | 0.57513354 | 4 | 0.270747695 | 1 |
| 702 | 0.727271332 | 2 | 0.247335837 | 6 |
| 703 | 0.698003891 | 3 | 0.253326403 | 4 |
| 704 | 1 | 1 | 0.249948718 | 5 |
| 705 | 0.24602397 | 5 | 0.256499316 | 3 |
| 706 | 0.002906696 | 12 | 0.2390153 | 11 |
| 707 | 0.094757987 | 6 | 0.244212847 | 9 |
| 708 | 0.058779607 | 7 | 0.24569009 | 8 |
| 709 | 0.032508334 | 9 | 0.259282902 | 2 |
| 710 | 0.030619741 | 10 | 0.245888407 | 7 |
| 711 | 0.036844006 | 8 | 0.241598097 | 10 |
| 712 | 0.006130765 | 11 | 0.234529882 | 12 |
| 713 | 0.00013637 | 17 | 0.221827781 | 14 |
| 714 | 0.001666251 | 13 | 0.214770424 | 15 |
| 715 | 0.001189442 | 14 | 0.228847779 | 13 |
| 716 | 0.000249992 | 15 | 0.207333674 | 16 |
| 717 | 2.08E-06 | 20 | 0.156760582 | 21 |
| 718 | 1.68E-06 | 21 | 0.167606602 | 19 |
| 719 | 0.000233419 | 16 | 0.192207587 | 18 |
| 720 | 7.08E-05 | 18 | 0.198049573 | 17 |
| 721 | 5.12E-08 | 23 | 0.145016364 | 22 |
| 722 | 7.99E-06 | 19 | 0.163403513 | 20 |
| 723 | 1.71E-07 | 22 | 0.141694285 | 23 |

FIG. 8

| Subgroup A | Subgroup B | Subgroup C | Subgroup D |
|---|---|---|---|
| 701 | Empty | 707 | 706 |
| 702 | | 708 | 712 |
| 703 | | 709 | 713 |
| 704 | | 710 | 714 |
| 705 | | 711 | 715 |
| | | | 716 |
| | | | 717 |
| | | | 718 |
| | | | 719 |
| | | | 720 |
| | | | 721 |
| | | | 722 |
| | | | 723 |

FIG. 9

| Subgroup A | Subgroup B | Subgroup C | Subgroup D |
|---|---|---|---|
| 701 | 702 | 709 | 706 |
| 703 | 707 | 710 | 712 |
| 704 | 708 | | 713 |
| 705 | 711 | | 714 |
| | | | 715 |
| | | | 716 |
| | | | 717 |
| | | | 718 |
| | | | 719 |
| | | | 720 |
| | | | 721 |
| | | | 722 |
| | | | 723 |

FIG. 10

METHODS OF ANALYZING KEY ENTITIES IN A SOCIAL NETWORK

CROSS REFERENCE

This application is a continuation-in-part and claims benefit of U.S. patent application Ser. No. 15/148,952 filed May 6, 2016, which is a continuation-in-part and claims benefit of U.S. patent application Ser. No. 14/949,555 filed Nov. 23, 2015, which is a continuation and claims benefit of U.S. patent application Ser. No. 12/877,914 filed Sep. 8, 2010, now U.S. Pat. No. 9,195,962, which is a non-provisional and claims benefit of U.S. Provisional Patent Application No. 61/241,801 filed Sep. 11, 2009, the specification(s) of which is/are incorporated herein in their entirety by reference.

FIELD OF THE INVENTION

The present invention relates to analysis of social networks for use in marketing.

BACKGROUND OF THE INVENTION

Key entities are individuals or institutions whose opinions or actions are influential. They have the ability to influence the behavior of other entities in the same field or a related field. For example, key opinion leaders, in medicine, are generally medical practitioners or researchers relied upon by other practitioners or researchers to provide informative opinions on standard of care, pharmaceuticals, devices, and the importance of various biochemical pathways among other things. These opinions heavily influence the decisions and behaviors of other practitioners and researchers.

Key opinion leaders in medicine are often targeted by pharmaceutical and biotechnical companies. Key opinion leaders often provide these companies with marketing feedback and advocacy activity. In addition, key opinion leaders sometimes assist pharmaceutical companies in designing and engaging in clinical trials. Key opinion leaders also spread knowledge throughout the medical community on how and when to properly use a drug or device and provide feedback to the companies from the medical community on their products.

Identifying, establishing relationships with, and maintaining relationships with key opinion leaders is time consuming and expensive. It is therefore desirable to efficiently select key opinion leaders which meet the needs of a contacting company. For example, in the field of medicine, it may be more important to select someone who works on a specific subtype of lymphoma as that individual may have more influence over practitioners who deal with patients with that lymphoma subtype. Also, it may be important to choose a key opinion leader who has influence over practitioners practicing in certain geographic regions.

The most common current method used to for select key entities, such as key opinion leaders, is by using surveys. This technique has disadvantages. For instance, surveys tend to be very biased. Individuals who receive surveys tend to select their friends or close colleagues as key opinion leaders rather than making an objective selection. This is due to, at least in part, the fact that survey responders are limited to those individuals willing to fill in the survey in exchange for an honoraria, and over time subject matter experts within a domain respond to the surveys with the same answers producing the similar results.

Furthermore, the preparation, and interpretation of these surveys can be time consuming. Those who are surveyed generally expect to be monetarily compensated for their time. Moreover, considerable effort may be spent on identifying which persons to send the surveys to. Thus, improved techniques for identifying key entities are needed.

A social network is a structure of nodes which generally represent organizations or individuals but can represent other entities. The nodes are connected to one another by links which represent relationships between entities represented by the nodes. A graphic representation of a social network is called a sociogram.

Social network analysis is a process of generating information from a social network. Using the techniques of social network analysis, information on social prestige and social position can be obtained for entities or groups of entities in a network. Information on the transport of influence and communication in a network can also be harvested. Visualization of sociograms, for instance, assists in determining barriers to the movement of information or paths by which information is likely to diffuse through.

Advanced matrix mathematical methods can be used to obtain numerical variables, called network centrality metrics, which quantitatively indicate characteristics of a node in a network. These characteristics provide insight into the social role of an entity in the network. There are several different types of network centrality metrics, including betweeness, Bonacich's power centrality, closeness, degree, and eigenvector centrality, as well as others. Each provides different information on the status, or importance of an entity in a network. Combinations of values for the different centrality measures, for a particular entity, may be used in combination to assess that entities importance, or role in the network. In addition, non-centrality metric data, for instance a researcher's publication count or an institution's geography may be combined with the centrality metric values to obtain an even clearer picture of the role of an entity in a particular social network.

Recent advances in computer technology, including improvements in the speed at which data may be acquired from remote sources, through the Internet, and the increased ability of a computer to manipulate large amounts of data within a short period of time have made the acquisition, construction, and analysis of large social networks, using network centrality metrics and other procedures, possible. In addition, new text matching software, designed for cleaning of large data sets, allows for the accurate analysis of large social networks from which a wealth of diverse, informative data can be constructed.

Methods for identifying key entities based on network and/or relationship properties have been described previously. For example, U.S. Patent Application Publication 2007/0271272 A1 teaches using connections in a personal-communications network to identify opinion leaders, where connections may be defined by the quantity of times a person's name is searched in a search engine. The method does not, however, teach segmentation of key entities using network centrality measures or the use of reach in combination with network centrality measures to systematically define adequate numbers of key entities in a subgraph of key entities or subgroups of key entities.

US 2006/0184464 A1 teaches finding individuals in organizations that are key individuals using profiles built from analyzing metadata including relationship data from a dataset. US 2006/0184464 A1 does not teach network centrality metrics or reach or segmentation.

US 2004/0073476 A1 teaches a method for obtaining a subgraph of key opinion leaders based upon an automated survey methodology. The method does not teach social network analysis for identifying key entities.

US 2002/0169737 A1 discloses an Internet accessible method for displaying relationships between people, organizations, and articles. This application also teaches the concept of "reach" to assess the connectedness of an entity in a network. It does not teach network centrality metrics or segmentation of key entities by network centrality metrics or the use of reach in combination with network centrality metric values to systematically define adequate numbers of key entities in a subgraph of key entities or subgroups of key entities.

US 2005/0080655 A1 teaches a method of assessing the quality of collaborative relationships, mentioning the use several different possible approaches including social network analysis (SNA). While reach and centrality metrics are mentioned as possible tools to assess quality of relationships, no systematic method for identifying key entities is presented using reach and centrality measures. The reference does not teach segmentation of key entities by network centrality metrics or the use of reach in combination with network centrality metric values to systematically define adequate numbers of key entities in a subgraph of key entities or subgroups of key entities.

SUMMARY OF THE INVENTION

Disclosed herein are one or more techniques for identifying key entities in a network, building a subgraph, or invisible college, of these key entities, segmenting the subgraph of key entities into specific sub-groups based upon their roles in the network, identifying bridge builders between sub-groups, identifying work-circles of frequently collaborative entities, and identifying institutions which are centers of significance. These techniques may be used as an alternative to the survey method for finding key opinion leaders, which avoids the disadvantages described above.

In accordance with one aspect, a method for obtaining a subgraph of key entities is provided. The method may comprise determining at least two types of network centrality metrics for all entities in the giant component of the network using statistical computer programs executed by one or more processors. Rank-based scores are then assigned to each network centrality metric value of each entity. Entities are selected to form a tentative subgraph of key entities based on their network centrality metric rank-based scores using preset cut-off criteria. The reach of the entities in the tentative subgraph is calculated, and the reach is compared to a reach range. If the reach falls within the reach range, then the entities in the tentative subgraph are assigned to a subgraph of key entities. If the reach does not fall within the reach range, then a portion of the above process is repeated using alternate rank-based scores cut-off criteria until a subgraph of key entities having a reach within the desired reach range is formed.

In accordance with another aspect, a method for segmenting a subgraph of key entities of a network into sub-groups based on network centrality metrics is provided. The method includes calculating at least two different network centrality metric values for each entity in the subgraph of key entities using statistical computer program executed by one or more processors. A rank-based score is assigned to each of the network centrality metric values. A plurality of rank-based score ranges are defined for each of the network centrality metrics. For each rank-based score of each entity, it is determined which of the corresponding rank-based score ranges that the rank-based score falls within. Each of the subgraph of key entities is assigned to sub-groups based upon the rank-based score ranges that their rank-based scores fall within.

In accordance with some aspects, a method for identifying bridge-builders between subgroups is provided. The method may comprise generating a subgraph of key entities in a network, segmenting the subgraph of key entities of a network into subgroups based on network centrality metrics, and identifying entities which span the subgroups, based on the frequency of first and second degree connections between entities.

In accordance with other aspects, a method for identifying work-circles is provided. The method may comprise computing affinity scores for each fink in the subgraph. In some embodiments, the affinity scores are computed based on collaborations between the entities. Subgroups with high degrees of mutual collaboration are then identified starting with the entities with the highest overall affinity scores. This group is then refined to only those entities in the group with highest internal collaboration within the group. After removing the refined group of entities, the process is repeated in the reduced subgraph, and the process is then repeated until no more entities are left. In this way the subgraph is divided into workcircles comprising groups which frequently collaborate.

In accordance with another aspect, a method for identifying centers of significance is provided. The method may comprise generating a subgraph of key entities in a network, and for each key entity identifying important institutions they are members of. The important institutions are identified by counting the number of key entities and entities who are members, and the number of connections between members of the same institution and between institutions. Institutions can be ranked by a formula based on the number of internal and external connections and the top ranked institutions are considered centers of significance.

According to additional aspects, the present invention includes a method of dividing a subgraph of entities into a plurality of clusters of entities. The method may comprise computing an affinity score for each link in the subgraph, computing a total affinity score for each entity in the subgraph, ranking the entities according to their total affinity scores, selecting a plurality of entities of the highest rank from the subgraph, computing ingroup affinity scores for the entities of the plurality of entities, ranking the entities in the plurality of entities according to their ingroup affinity scores, selecting a cluster of entities from the plurality of entities with the highest ingroup affinity scores, and removing the cluster of entities from the subgraph. The steps can be repeated until every entity in the subgraph has been assigned to one of a plurality of clusters extracted from the network. After removing the cluster of entities from the subgraph, the cluster of entities can be added to a plurality of clusters of entities.

Other aspects, features, advantages and variations of the methods, systems, articles of manufacture and techniques disclosed herein will be or will become apparent to one with skill in the art upon examination of the following figures and detailed description. It is intended that all such additional aspects, features, variations and advantages be included within this description and be protected by the accompanying claims.

BRIEF DESCRIPTION OF THE DRAWINGS

FIG. 4 is an exemplary list containing identifiers for entities in a friendship network, betweeness centrality and eigenvector centrality metric values for these entities, and rank-based scores for each of these entities.

FIG. 5 is an exemplary list identifying entities in a subgraph of key entities obtained from the friendship network along with betweeness centrality and eigenvector centrality metric values for these entities, rank-based scores for each of these entities, and a combined reach for these entities.

FIG. 6 is an exemplary list identifying entities in a subgraph of key entities obtained from the friendship network along with betweeness centrality and eigenvector centrality metric values for these entities, rank-based scores for each of these entities, and a combined reach for these entities.

FIG. 7 is an exemplary list identifying the entities in a subgraph of key entities obtained from a scientific research network.

FIG. 8 is an exemplary list identifying the key entities in a subgraph of key entities obtained from a scientific research network along with closeness centrality and eigenvector centrality metric values for these entities, and rank-based scores for each of these entities.

FIG. 9 is a figure depicting exemplary subgroups formed by segmentation of a subgraph of key entities using one set of closeness centrality and eigenvector centrality rank based score criteria.

FIG. 10 is a figure depicting exemplary subgroups formed by segmentation of a subgraph of key entities using an alternate set of closeness centrality and eigenvector centrality rank based score criteria.

DESCRIPTION OF PREFERRED EMBODIMENTS

Figure 1:
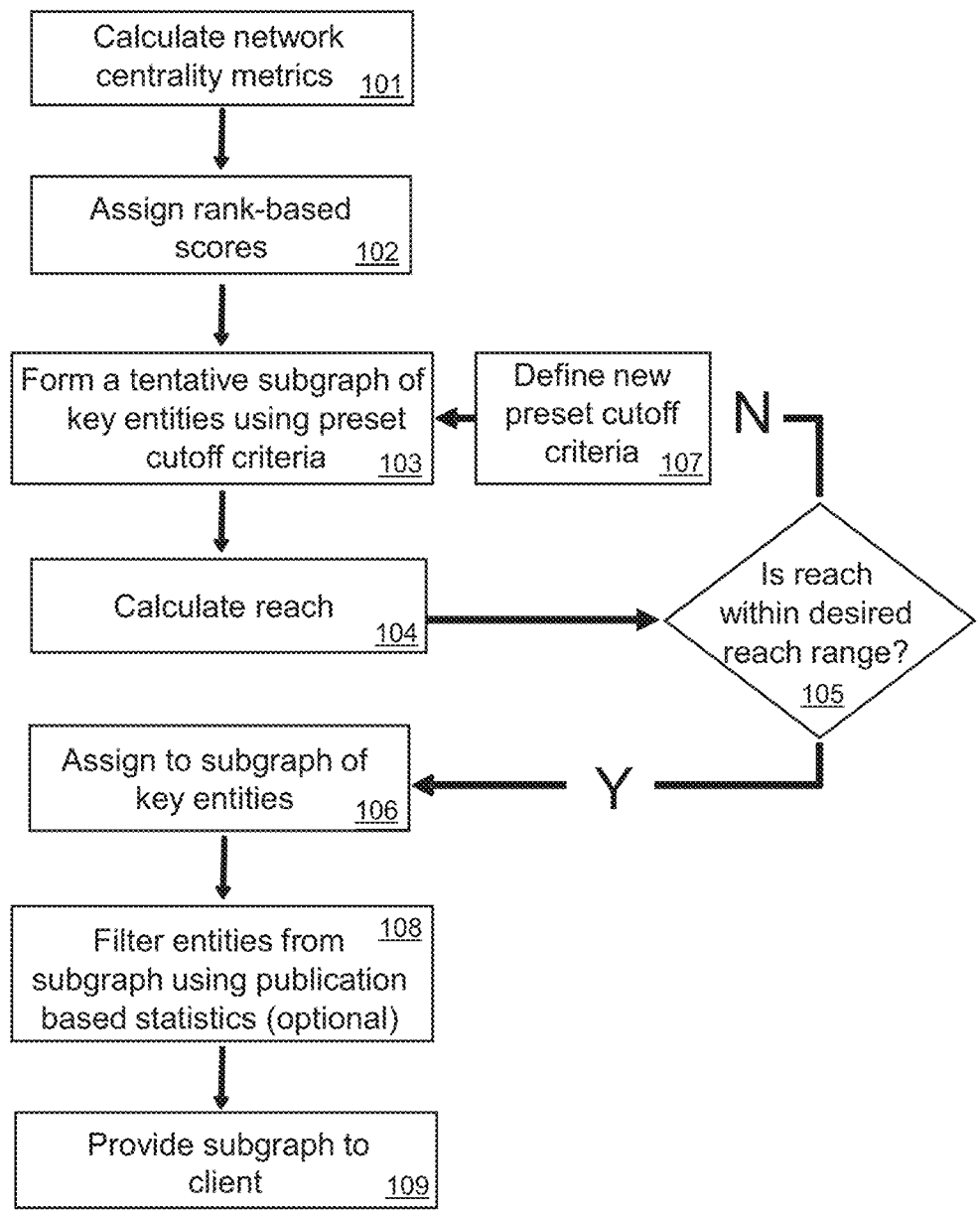
FIG. 1 is a flow diagram which depicts an exemplary method of generating a subgraph of key entities in a network.

The following detailed description, which references to and incorporates the drawings, describes and illustrates one or more specific embodiments of what is claimed. These embodiments, offered not to limit but only to exemplify and teach the invention, are shown and described in sufficient detail to enable those skilled in the art to practice the invention defined by the claims. Thus, where appropriate to avoid obscuring the invention, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

The techniques described herein are generally aimed towards the analysis of networks to identify and key entities, and to split them into key entity subgroups using social network analysis centrality measures.

According to some embodiments, in a non-transitory computer-readable medium, a first method of the present invention comprises a method of generating a subgraph of key entities in a network, segmenting the subgraph of key entities of a network into subgroups based on network centrality metrics, and identifying entities which span the subgroups. Generating the subgraph comprises determining at least two independent types of network centrality metrics for a plurality of entities in a giant component of the network, selecting starting cut-off criteria for each network centrality metric, assigning a plurality of rank-based scores to each entity, where each rank based score corresponds to each network centrality metric value of each entity selecting some of the entities to form a tentative subgraph of key entities, where the selection of key entities is based on comparisons of the plurality of rank-based scores to the plurality of cut-off criteria, calculating reach of the entities in the tentative subgraph of key entities and comparing the reach to a reach range, adjusting the selection cut-off criteria and iteratively adjusting the subgraph until the reach range is met. The selection process comprises iteratively identifying the entities whose centrality metric score for a network centrality metric exceeds the cut-off criteria, and merging the identified entities into the tentative subgraph, for each network centrality metric. If the reach falls within the reach range, defined as falling above the minimum reach threshold and below the maximum reach threshold, the entities in the tentative sub graph are assigned to the subgraph of key entities, wherein the subgraph of key entities represents a core group of key opinion leaders within a social network. If the reach does not fall within the reach range, one or more of the cut-off criteria for each network centrality metric is adjusted.

In a primary embodiment, segmenting the subgraph into subgroups may comprises calculating at least two independent network centrality metric values for each entity in the sub graph of key entities, assigning a plurality of rank-based scores to each entity, where each rank based score corresponds to each network centrality metric value of each entity, defining a plurality of rank-based score ranges for each of the network centrality metrics, defining a plurality of subgroups corresponding to combinations of the rank based score ranges, assigning entities of the sub graph of key entities to one or more subgroups, comprising: for each rank based score range, determining the score range that the entity's rank-based score falls into, for each subgroup, determining if the entity's rank-based scores fall within the score ranges corresponding to the subgroup, assigning the entity to the corresponding subgroup, and if the entity falls within more than one subgroup, optionally removing the entity from one or more of the subgroups.

In a primary embodiment, identifying a plurality of entities which span the subgroups may comprise for each entity in each subgroup, determining the shortest path through the network to each entity in each of the other subgroups, resulting in an array of connection paths for each entity, counting the number of first and second degree connections to members of other subgroups each entity has, wherein a first degree connection is a single-link relationship between an entity and another entity in a different subgroup, wherein a second degree connection is a two-link relationship between an entity and another entity in a different subgroup, resulting in a bridging connection count for each entity; and selecting a plurality of entities with the highest bridging connection counts.

According to other embodiments, in a non-transitory computer-readable medium, the present invention features a method of generating a subgraph of key entities in a network, and centers of significance within the network. The method may comprise for each entity in the network, identifying a list of organizations to which the entity belongs, for each entity in the subgraph of key entities, identifying a list of organizations to which the entity belongs, counting the number of entities with a membership in each organization, counting the number of key entities with a membership in each organization, for each organization, counting the number of connections between entities with a membership in the organization, for each organization, counting the number of connections between members and non-members of the organization, ranking the organizations according to a formula based on the number of entities and key entities belonging to the organization, and the number of connections within and outside the organization, selecting a plurality of the highest ranking organizations. Identifying entities which are important within each center of significance, comprising: for each entity with a membership in each center of significance: counting the number of connections to other entities with a membership in the center of significance; and counting the number of connections to entities who are not members of the center of significance; ranking the entities according to a formula based on the number of connections within the center of significance and outside the center of significance; and selecting a plurality of entities with the highest rank.

According to some embodiments, in a non-transitory computer-readable medium, the present invention features a method of dividing a subgraph of entities into a plurality of clusters of entities. The method may comprise computing an affinity score for each link in the subgraph, computing a total affinity score for each entity in the subgraph, where the total affinity score of the entity is the sum of the affinity scores of all links connected to the entity, ranking the entities according to their total affinity scores, and selecting a plurality of entities of the highest rank from the subgraph. The method may also include computing ingroup affinity scores for the entities of the plurality of entities comprising, for each entity in the plurality of entities, summing the affinity scores for the links connecting the entity to other entities in the plurality of entities. The method may further comprise ranking the entities in the plurality of entities according to their ingroup affinity scores, selecting a cluster of entities from the plurality of entities with the highest ingroup affinity scores, removing the cluster of entities from the subgraph, and adding the cluster of entities to a plurality of clusters of entities.

In some embodiments, the steps of computing an affinity score for each link in the subgraph, computing a total affinity score for each entity in the subgraph, ranking the entities according to their total affinity scores, selecting a plurality of entities of the highest rank from the subgraph, computing ingroup affinity scores for the entities, ranking the entities in the plurality of entities according to their ingroup affinity scores, selecting a cluster of entities from the plurality of entities with the highest ingroup affinity scores, and removing the cluster of entities from the subgraph can be repeated until every entity in the subgraph has been assigned to one of a plurality of clusters extracted from the network.

In some embodiments, the selection of the plurality of entities with the highest rank may comprise selecting a configurable number of the highest ranking entities. In other embodiments, the selection of the plurality of entities with the highest rank may comprise selecting the entities with a total affinity score above a threshold.

In one embodiment, the selection of the cluster of entities with the highest affinity scores may comprise selecting a configurable number of entities. In another embodiment, the selection of the cluster of entities with the highest ingroup affinity may comprise selecting entities with ingroup affinity scores above a threshold. In some embodiments, the affinity scores may be computed from a formula including the number of collaborations with other entities, the age of collaborations with other entities, and the frequency of collaboration with other entities.

According to one embodiment, the method of dividing a subgraph of entities into a plurality of clusters of entities may further comprise identifying key entities in each cluster. This step of identifying key entities in each cluster may comprise determining at least two independent types of network centrality metrics for the plurality of entities in the cluster, selecting a cutoff criteria for each metric, assigning a plurality of rank-based scores to each entity, where each rank based score corresponds to each network centrality metric value of each entity, and identifying the entities whose rank-based score exceeds the cut-off criteria for each metric.

According to one embodiment, the method of dividing a subgraph of entities into a plurality of clusters of entities may further comprise identifying key clusters within the network. This step may comprise determining at least two independent types of network centrality metrics for the plurality of clusters in the network, selecting a cutoff criteria for each metric, assigning a plurality of rank-based scores to each cluster, where each rank based score corresponds to each network centrality metric value of each cluster, and identifying the clusters whose rank-based score exceeds the cut-off criteria for each metric.

In some embodiments, the centrality metrics may comprise a binding affinity, the number of entities in the cluster, and a relevance of the member's metadata. The binding affinity can be a measure of the frequency of collaboration within the cluster. The relevance can refer to the frequency with which the components of the member's metadata appear in a keyword taxonomy, which is a list of keywords associated with a field of interest.

According to some embodiments, the method may further comprise generating a report of members in key clusters with highly relevant expertise. This step of generating the report may comprise for each key cluster, ranking the members according to the relevance of the member's metadata, selecting a cutoff criteria, and selecting a plurality of members according to the cutoff criteria.

Other embodiments of the present invention may comprise a method of dividing a network into work circles of entities in the network, wherein each entity has a plurality of associated metadata, wherein a work circle is a plurality of entities with similar metadata, wherein the method comprises: defining a metadata vector, wherein the metadata vector comprises a plurality of data about the entity, populating the metadata vector for each entity in the network, resulting in a set of metadata vectors associated with each entity in the network, resulting in a plurality of metadata vectors, applying a k-means clustering algorithm to the plurality of metadata vectors, resulting in k clusters of metadata vectors with similar values, and identifying the plurality of members associated with each vector in the metadata clusters, wherein the plurality of members associated with a metadata cluster is a work circle.

In an alternative embodiment, the invention may comprise "fingerprinting" for each person in the network. In some embodiments, the fingerprint may comprise a combination of network centrality scores. In an alternative embodiment, the fingerprint may comprise metadata. In some embodiments, the finger print may be used to identify individuals with similar fingerprints. In some embodiments, the invention may be used to recommend introductions or collaborations between similar individuals who have not previously collaborated or with few network links. The following is a non-limiting example of "fingerprinting". If Person X has measures A, B, C and Person Y also has measures similar to A, B, C, then Person X and Person Y would be recommended to a client who only knew Person X or Person Y previously, Another non-limiting example of "fingerprinting" is through metadata similarity. For instance, if Person X did 50% of his work in area A, 25% in Area B, and 25% in Area C, finding people with similar metadata profiles can help clients to identify alternate people to work with.

FIG. 1 is a flow diagram which illustrates an exemplary method for obtaining a subgraph of key entities and dividing the entities into different subgroups based upon network centrality measures possessed by the entities. The method comprises, determining at least two types of network centrality metrics for all entities in the giant component of the network using statistical algorithms executed by a microprocessor or other mechanical processing device (101); assigning rank-based scores to each network centrality metric value of each entity (102); selecting entities to form a tentative subgraph of key entities based on their network centrality metric rank-based scores using preset cut-off criteria (103); calculating the reach of the entities, in the tentative subgraph of key entities (104), and comparing that reach to a desired reach range (105); if the reach falls within the reach range then assign the entities in the tentative subgraph of key entities to a subgraph of key entities (106); if the reach does not fall within the reach range then iteratively repeat the above process using alternate rank-based scores cut-off criteria (107), until a subgraph of key entities with a reach within the desired reach range is formed; optionally filtering entities from the subgraph of key entities using publication-based statistics (108); and contacting one or more of the entities in the subgraph, and/or delivering the subgraph to one or more clients (109).

The term "network entities" or "entities" generally refer to objects represented by a node in a network. In some instances, an entity is a person, such as a publication author, scientist, inventor political donator, philanthropist, a criminal, a physician, a nurse, a clinical worker, or an infected person.

A "subgraph" is used in this document to describe a set of entities from network of entities. Entities which are part of a subgraph and their associated data including metrics can be indicated in a list or graphically displayed as a set of nodes and links or by other means known to those of ordinary skill in the art.

The network may be a publication-based network. Publication-based networks are generally networks whose links are defined, at least in part, by publication commonalities. These may include but are not limited to co-citation, shared institution, shared journal, magazine, or newspaper, or co-authorship.

This type of information can be obtained, for instance, by searching through journal databases or the Internet and extracting that information either manually or using text mining software from electronic journals or article summaries or other methods known to those of ordinary skill in the art.

In some circumstances, the entities may be publication authors and links or connections between the entities are based upon co-authorships, co-citations, or email interactions, or other human interactions. In addition to its ordinary meaning, human interaction also refers to any social system in which organisms interact with other organisms and their collective co-existence, irrespective of whether the organisms are aware of it or not, and irrespective of whether the interaction is voluntary or involuntary. The connections may also include human-machine-human interactions, where a machine may be an intermediary step between any two humans. Links may be single links or multiple links or non-integer links. Information on email based relationships between entities can be obtained, for instance, from blogs or personal management software, surveys, or other sources known to those of ordinary skill in the art.

In other circumstances, the entity may be an institution, a topic, such as a protein, a clinic, or a patent. Information on protein networks can be obtained from scientific journals and websites, for example. Information on patents, for example relationships between inventors or assignees, can be obtained from patent databases, for example, An example of where relationships between clinics can be identified, for instance, relationships between clinics defined by joint participation in specific clinical trials, can be obtained from websites, such as www.clinicaltrials.gov.

In another example, the entities are institutions and links are based upon co-authorships, co-citations, or other cross-intuitional relationships. A good source for information on cross-institutional relationships is the Internet, including institution websites and electronic publications.

The term "reach" is generally defined as the fraction or amount of entities in a network or subcomponent of a network which are connected to another entity or a group of entities in the network. Reach can be measured in a number of ways including by first-degree links, second-degree links, or higher order links. First-degree or second-degree links refer to the shortest link path distance between any two nodes. Nodes with a shortest link path of two are two links apart have a second-degree link. Stated differently, the two nodes are separated by another node. Nodes with a shortest link path distance of one are directly connected through a single link, and are considered to be adjacent to each other, i.e., these adjacent nodes are connected by a first-degree link.

In one example, the reach is the fraction of entities in the giant component which are connected to the entities in the tentative subgraph by first-degree links, second-degree links or a combination thereof.

In another example, the reach is the fraction of entities in the giant component which are connected to the entities in the tentative subgraph of key entities by first-degree links.

The term "network centrality metrics" includes measures of centrality used in graph theory and network analysis. These measures indicate the importance of a node in a graph. In graphs where nodes correspond to entities and graphs correspond to collections of entities and their connections, these measures indicate the importance of an entity in a collection of entities. Some exemplary network centrality metrics include degree centrality, betweeness centrality, eigenvector centrality, Bonacich's power centrality, and closeness centrality. Computer programs, such as statistics and/or social networking software, e.g., UCINET or SAS, can be used to calculate these metrics from network adjacency matrices constructed for the networks. A person may also write their own code using, for instance, Java, FORTRAN, or C++.

The networks on which the centrality metric computer programs are generally applied are large and consist of many nodes and links. Therefore, execution of these programs, on a reasonable timescale, may be performed by computers. The use of a computer involves the translation of social network analysis algorithms into specific computer program code, which may be reasonably accomplished by those of ordinary skill in the art.

The term "giant component" generally refers to the largest group of connected nodes in a graph. It should be understood, however, that there may be multiple sub-graphs in a network and the "giant component" may refer to some or all of these.

The reach of the tentative subgraph of the key entities may be calculated following its establishment. If the reach falls below or above a particular reach range, then cutoff-values can be changed to alter the number of the rank-based scores which are acceptable to permit inclusion of an entity into the tentative subgraph of key entities.

The term "publication-based statistics" generally refers to statistics or variables related to extent of publication, for example publication count, but may also refer to geography of publication, impact factor, or other variables associated with publications, or that can be embedded in or extracted from one or more publications.

Figure 2:
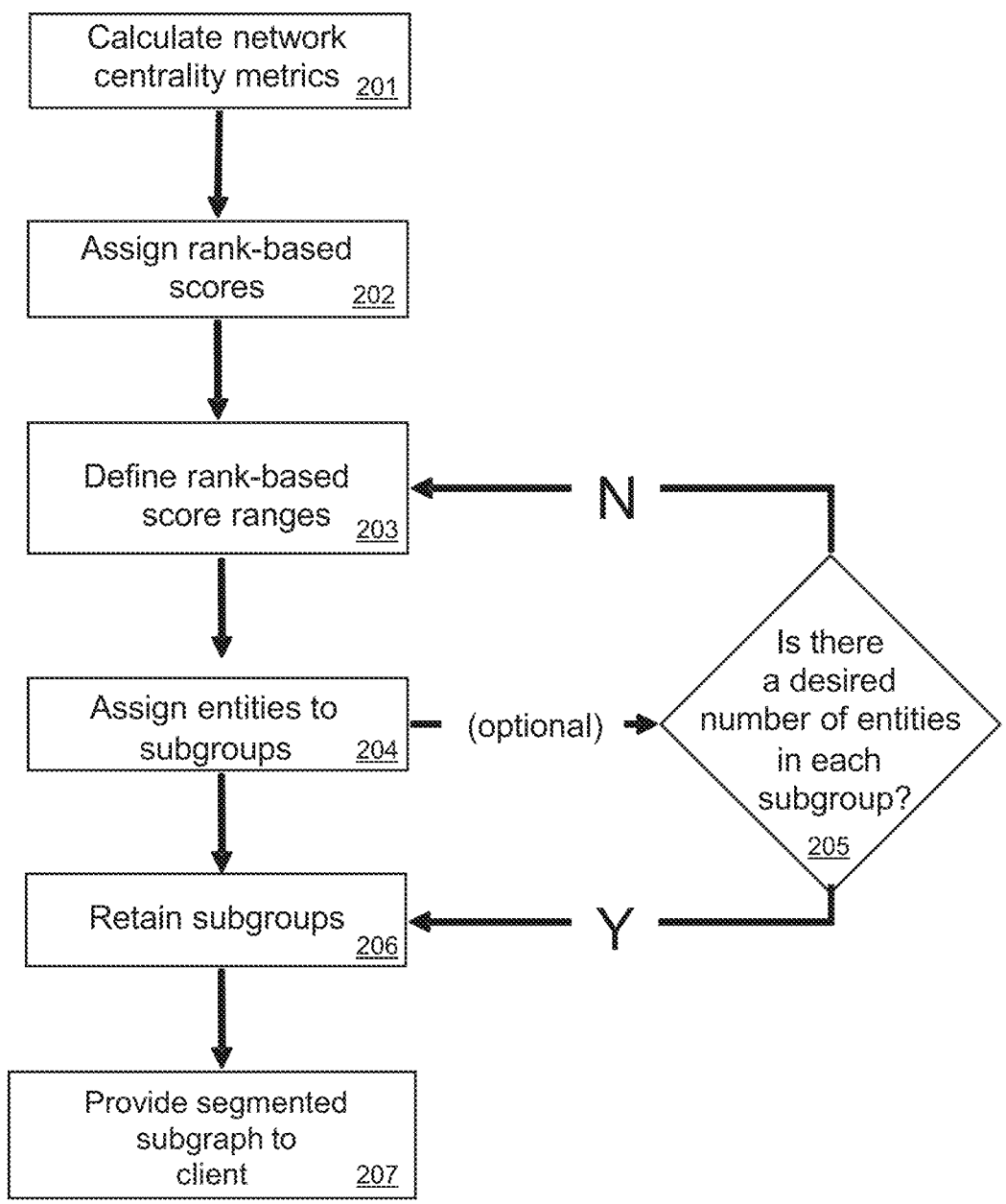
FIG. 2 is a flow diagram which depicts an exemplary method of segmenting a subgraph of key entities of a network into sub-groups based on network centrality metrics.

FIG. 2 is a flow diagram which illustrates an exemplary method of segmenting a subgraph of key entities of a network into sub-groups based on network centrality metrics (200).

The method includes calculating at least two different network centrality metric values (201), for each entity in the subgraph of key entities using statistical algorithms executed by a microprocessor or other mechanical processing device; assigning a rank-based score to each of the network centrality metric values (202); defining two or more rank-based score ranges for each of the network centrality metrics (203); for each rank-based score of each entity determining which of the corresponding rank-based score ranges that the rank-based score falls within; assigning each of the subgraph of key entities to sub-groups based upon the rank-based score ranges that their rank-based scores fall within (204); and optionally, repeating the above steps (205) using alternative rank-based score ranges until a desired number of entities is assigned to each sub-group (206); and contacting one or more of the entities in one or more of the segmented subgraphs, and/or delivering the segmented subgraph to one or more clients (207).

In at least one embodiment of the invention at least three different types of network centrality metrics or, at least two different types of network centrality metrics and at least one publication related variable are used to segment a subgraph of key entities.

The term "segmenting" refers to dividing entities into subgroups. The entities in particular subgroups share similarities in their network centrality metric values or publication related statistics. For instance, entities with high betweeness centrality scores and low eigenvector centrality scores may be segmented together into a subgroup. In general, the subgroup in which a particular entity is segmented into will indicate something about the role of that entity in the network. The network may be a publication-based network.

Example 1

Figure 3:
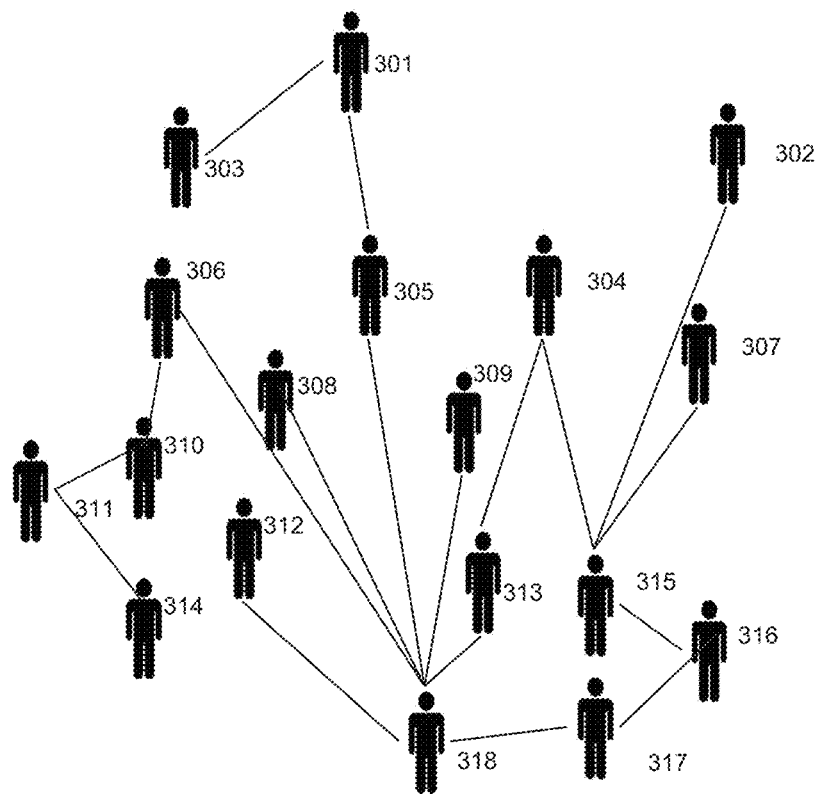
FIG. 3 is a representation of a network of individuals where nodes represent individual persons and links between nodes represent friendships between the nodes.

FIG. 3 depicts a small network (300) of persons who have relationships with one another defined by survey acknowledged friendship. In this example, we seek to identify a few key persons in the network to communicate information to in order to efficiently spread that information over most of the network. Icons (301-318) represent eighteen persons in the network. Friendship is represented by links connecting the eighteen individuals. In this example the links are not weighted, although they may be weighted in other circumstances.

The betweeness centrality and eigenvector centrality may be determine for this network and betweeness centrality and associated with each network entity. These values are listed in FIG. 4, along with their associated rank-based scores. Prior to the calculations, cut-off criteria are set, e.g., it was determined that only persons in the friendship network possessing top 15% betweeness centrality scores or top 15% eigenvector centrality scores would be contacted with the information desired to be communicated across the network. Individuals with high betweeness scores should be able to pass the information between the various disconnected subgroups of friends in the network. Individuals in the high eigenvector scores should be able to pass the information to a large number of other individuals in the network as these individual's possess friendships to popular individuals in the network.

As 15% of eighteen is about three, the three individuals within the network possessing top 15% betweeness centrality scores (e.g., icons 118, 115, and 113) were selected; and the three individuals within the network possessing the top 15% eigenvector centrality scores (icons 118, 113, and 117) were selected. Obviously, there is overlap between the selected groups of entities. When merged to form a tentative subgraph of key entities there are four unique entities (icons 118, 117, 113, and 115). The reach of these entities in the friendship network was then calculated using first-degree links and found to be 72%. That is, these four individuals, possessed first-degree connections to 72% of the network. These data are displayed in a list in FIG. 5.

In some situations, it may be desirable to communicate the piece of information to a higher percentage of individuals in the friendship network a larger reach than 72%. In order to achieve a higher reach it was deemed necessary to alter the permissible rank-based betweeness centrality and eigenvector centrality score ranges to top 22% rather than top 15%. The expanded ranges allow for the inclusion of two additional entities (icons 105 and 106) into the tentative subgraph of key entities. This subgraph now includes a total of six entities (icons 118, 117, 113, 115, 105, and 106). These entities have combined reach of 83%. These data are displayed in a list in FIG. 6. It was determined that this was an acceptable reach and the tentative subgraph of key entities can now be considered a subgraph of key entities. The subgraph of key entities was then delivered to the client as an email attachment.

Example 2

The second example illustrates segmentation of a subgraph of key entities using network centrality measures. In this example, a subgraph of twenty-three key entities in a scientific research network is present. The subgraph entities are displayed in a list in FIG. 7. It should be noted that the subgraph of key entities (700) in this example may or may not have been constructed using network centrality measures. In this example, the client's interest is in marketing an expensive computer program to persons in the subgraph of key entities. Note also that the entities' names, profiles, and other descriptors have been replaced by numeric identifiers (701-723). In this case, the client would like to place more resources into marketing the product to influential people in the subgraph of key entities with the hope that if they purchase the program, other entities in the scientific research network will be in swayed into also purchasing the program.

The entities in the subgraph of key entities are segmented into four different subgroups.

Subgroup A includes individuals who are close to the center of the network and possess connections to well-connected entities in the network. These individuals, in general, have high values of eigenvector centrality and closeness centrality, and would likely possess the funding necessary to purchase the program and the influence necessary to sway others in the network to purchase the program.

Subgroup B includes individuals who are well connected to well-connected individuals in the network but are not working in the core of the network. These individuals should have high eigenvector centrality values and low closeness centrality values. It can be hypothesized that these individuals may be very influential in a small subset of the research network but are not very influential to the network on a whole because they may be working on an unpopular research topic. It may also be hypothesized that these individuals may or may not have the funding available to purchase the program.

Subgroup C includes individuals in the subgraph of key entities who are in the core of the network, perhaps because they work on a very popular research topic, but are not well connected to well-connected people in the network. These individuals should have high values of closeness centrality but not eigenvector centrality. It may be hypothesized that individuals in this subgroup may have a moderate degree of influence on other researchers in the network because they may be working on a very popular research topic and may be publishing in popular journals, but may or may not have enough funding available to purchase the computer program.

Subgroup D includes individuals who are not that well connected to well-connected individuals in the network and who are not at the core of the network. These individuals may not have funding to purchase the computer software we are marketing. It is also unlikely that these individuals will be able to influence other members of the network to purchase the software.

From an adjacency matrix containing relationship data for the entire network, eigenvector and closeness centrality metric values are calculated. The values are then ranked for individuals in the subgraph of key entities. The network centrality values and rank scores are appended to the subgraph of key entities and that table is shown in FIG. 8.

In this example, individuals segmented into Subgroup A have an eigenvector centrality rank that is between 1 and 5 and a closeness centrality rank that is between 1 and 10. Individuals segmented into Subgroup B are individuals not segmented into Subgroup A who have an eigenvector centrality rank score between 1 and 5. Individuals segmented into Subgroup C are individuals not segmented into Subgroup A who have a closeness centrality rank score of between 1 and 10. Subgroup D then contains all of the other entities in the key subgraph of entities.

As a result of these rank score criteria, the twenty-three entities are segmented to the four subgroups as indicated in FIG. 9. There are five entities in Subgroup A, no entities in Subgroup B, five entities in Subgroup C, and thirteen entities in Subgroup D.

To allow for more entities to be included into Subgroup B, the rank-based score ranges are then redefined.

The new ranges are as follows: Subgroup A has an eigenvector centrality rank that is between 1 and 5 and a closeness centrality rank that is between 1 and 5. Individuals segmented into Subgroup B are individuals not segmented into Subgroup A who have an eigenvector centrality rank score between 1 and 10 and whose eigenvector centrality rank score is greater than or equal to their closeness centrality rank score. Individuals segmented into Subgroup C are individuals not segmented into Subgroup A or Subgroup B who have a closeness centrality rank score of between 1 and 10. Subgroup D, as in the previous scheme, contains all of the other entities in the subgraph of key entities.

With these revised rank score criteria, the twenty-three entities were again segmented into the four subgroups as indicated in FIG. 10. There are four entities in Subgroup A, four entities in Subgroup B, two entities in Subgroup C, and thirteen entities in Subgroup D. It was decided that this segmentation gave an adequate number of entities in each subgroup and the subgroups should be retained. Several entities in the segmented subgraph were then contacted, by phone to deliver a marketing message to them.

Figure 11:
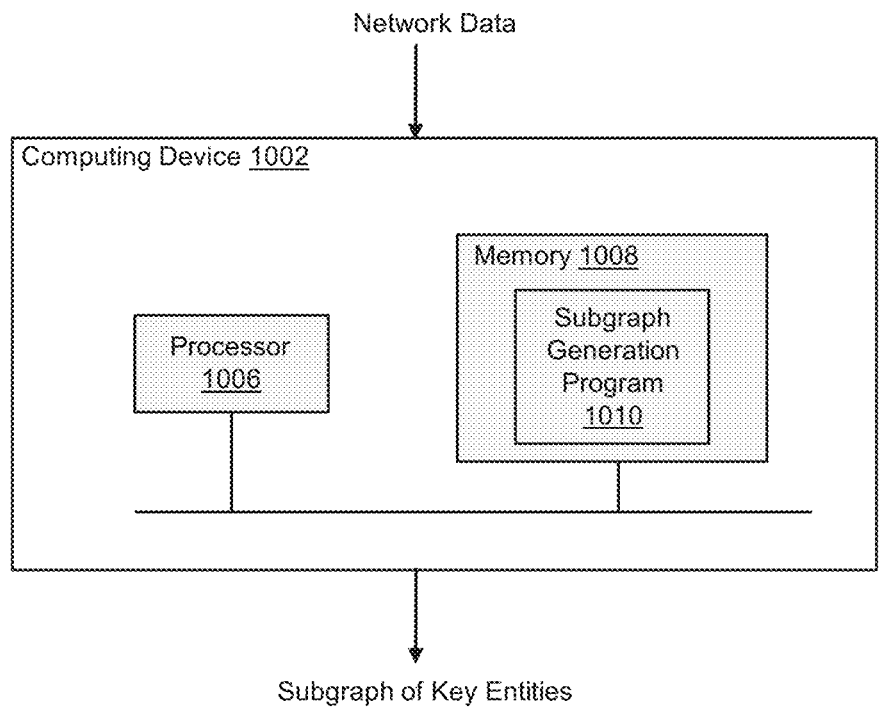
FIG. 11 is a conceptual block diagram illustrating certain components of an exemplary system for generating a subgraph of key entities in a network.

FIG. 11 is a conceptual block diagram illustrating certain components of an exemplary system for generating a subgraph of key entities in a network. The system includes a computing device (1002) having a processor (1006) and a memory (1008) in communication with one another. Among other things, the memory stores a subgraph generation computer program (1010). The memory (1008) may also store other programs and/or data. The processor (1006) includes one or more digital circuits, such as microprocessors, DSPs, embedded controllers, or intellectual property (IP) cores for executing programs stored in the memory (1008). The memory (1008) may be any suitable computer storage medium capable of storing instructions and/or data. In some embodiments, the computer storage medium capable is a non-transitory medium.

The computing device (1002) receives data about the network and entities within the network, and in turn, the subgraph generation program (1010) produces a subgraph of key entities by executing some or all of the method steps described above in connection with FIG. 1. Specifically, the subgraph generation program (1010) includes instructions executable by the processor 1006 for causing the computing device (1002) to perform some or all of the steps described above in connection with FIG. 1.

Figure 12:
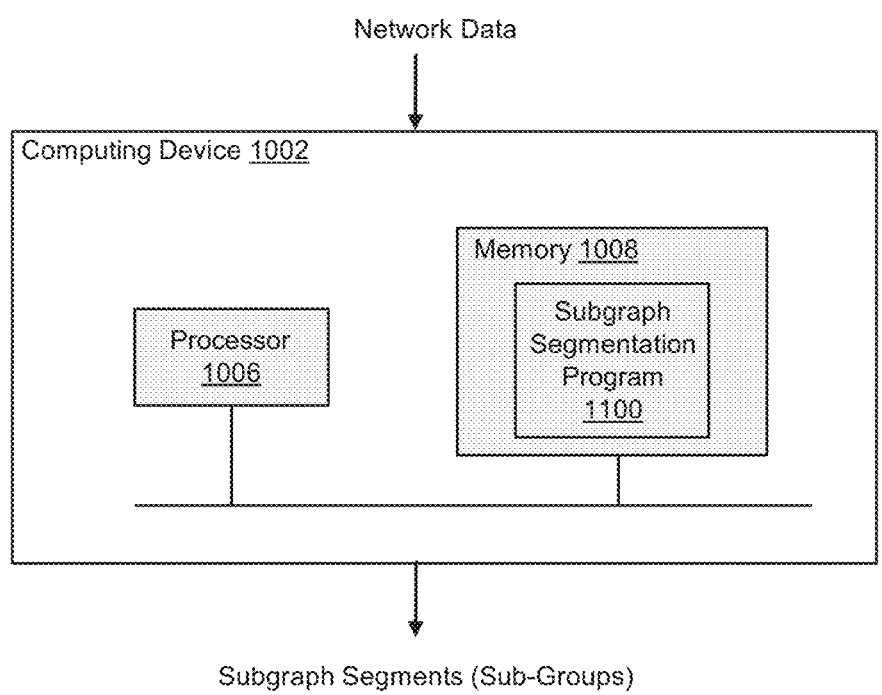
FIG. 12 is a conceptual block diagram illustrating certain components of an exemplary system for segmenting a subgraph of key entities of a network into sub-groups based on network centrality metrics.

FIG. 12 is a conceptual block diagram illustrating certain components of an exemplary system for segmenting a subgraph of key entities of a network into sub-groups based on network centrality metrics. The system includes the computing device (1002) having the processor (1006) and the memory (1008) in communication with one another. Among other things, the memory (1008) stores a subgraph segmentation computer program (1100).

Figure 13:
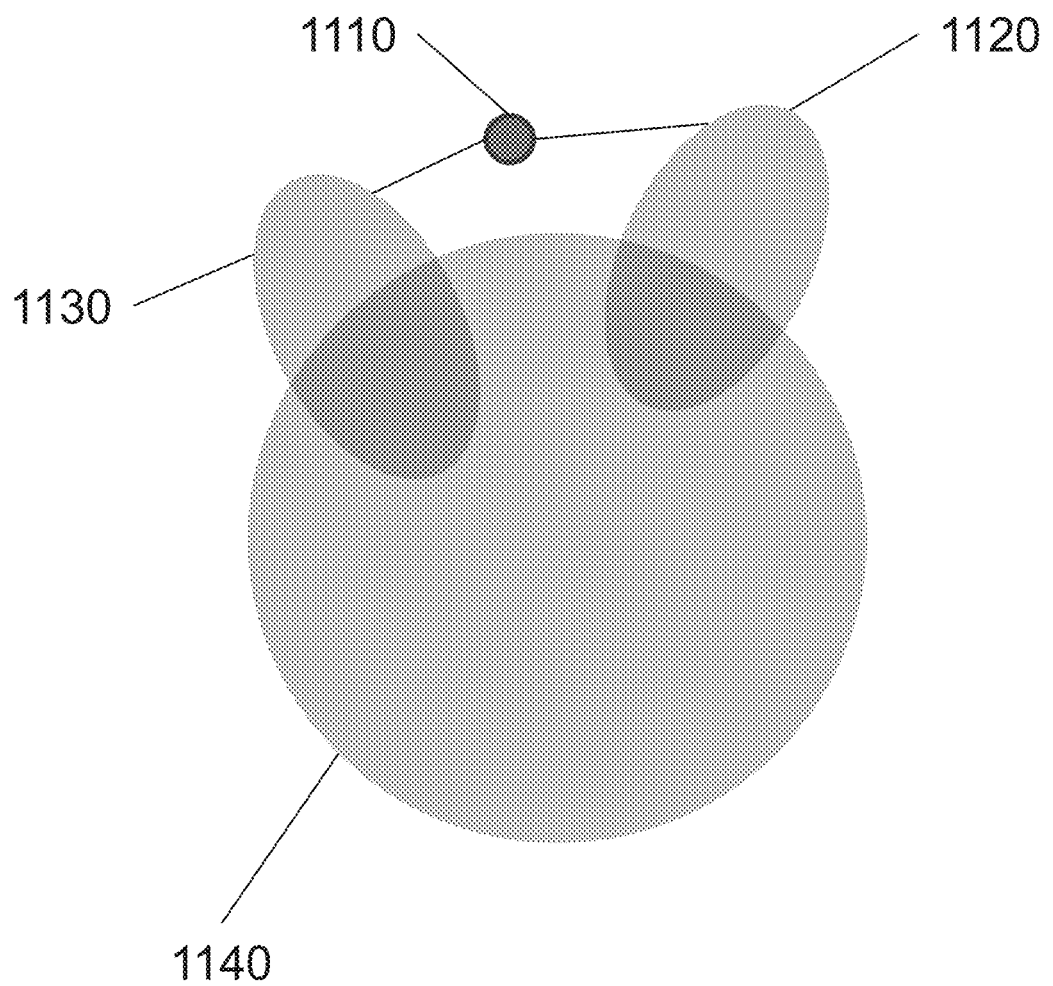
FIG. 13 is a conceptual block diagram illustrating the concept of a bridge builder.

FIG. 13 is a conceptual illustration of the role of a bridge-builder entity. A giant component of the network has two subgroups (1120, 1130). A bridge builder (1140) is an entity which has connections two other entities in both subgroups. Identifying bridge-builders is advantageous since bridge builders have reach from one subgroup into another. Bridge builders can be identified by counting the number of first and second-degree connections between entities and different subgroups (subgroups to which the entity does not belong). Bridge builder will be entities that have a large number of first and second degree connections to entities in at least one other subgroup.

Figure 14:
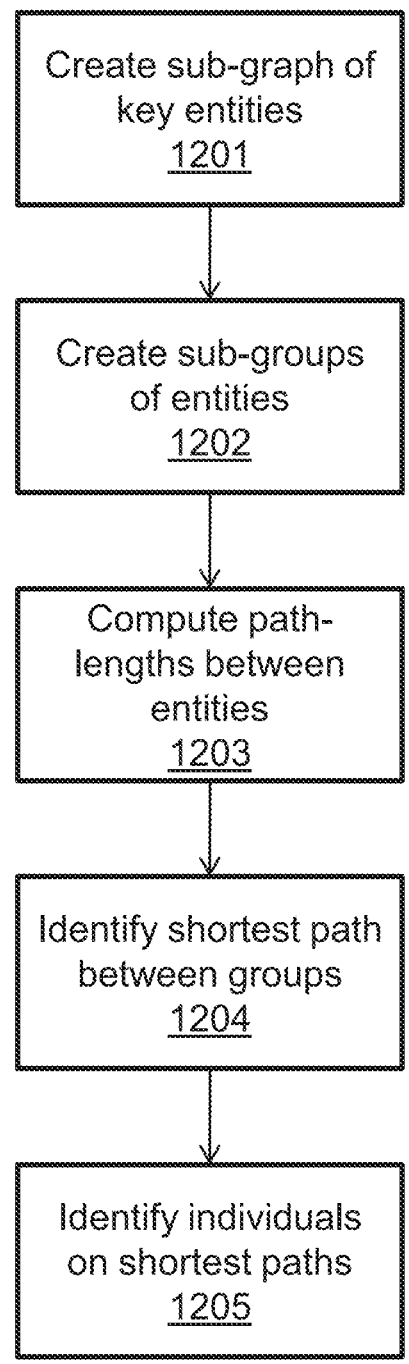
FIG. 14 is an example flow diagram depicting an example method of identifying bridge builders.

FIG. 14 illustrates a conceptual flow chart for identifying bridge builders. Initially a subgraph of entities is created (1201) as in FIG. 1. Secondly, the subgraph is split into subgroups (1202) as in FIG. 2. The path length to each entity from every other entity in the subgroup is computed (1203). The shortest path between entities in one subgroup to another is then identified, for each sub-group to sub-group pair (1204). The entities comprising this shortest path are identified as bridge builders (1205).

Figure 15:
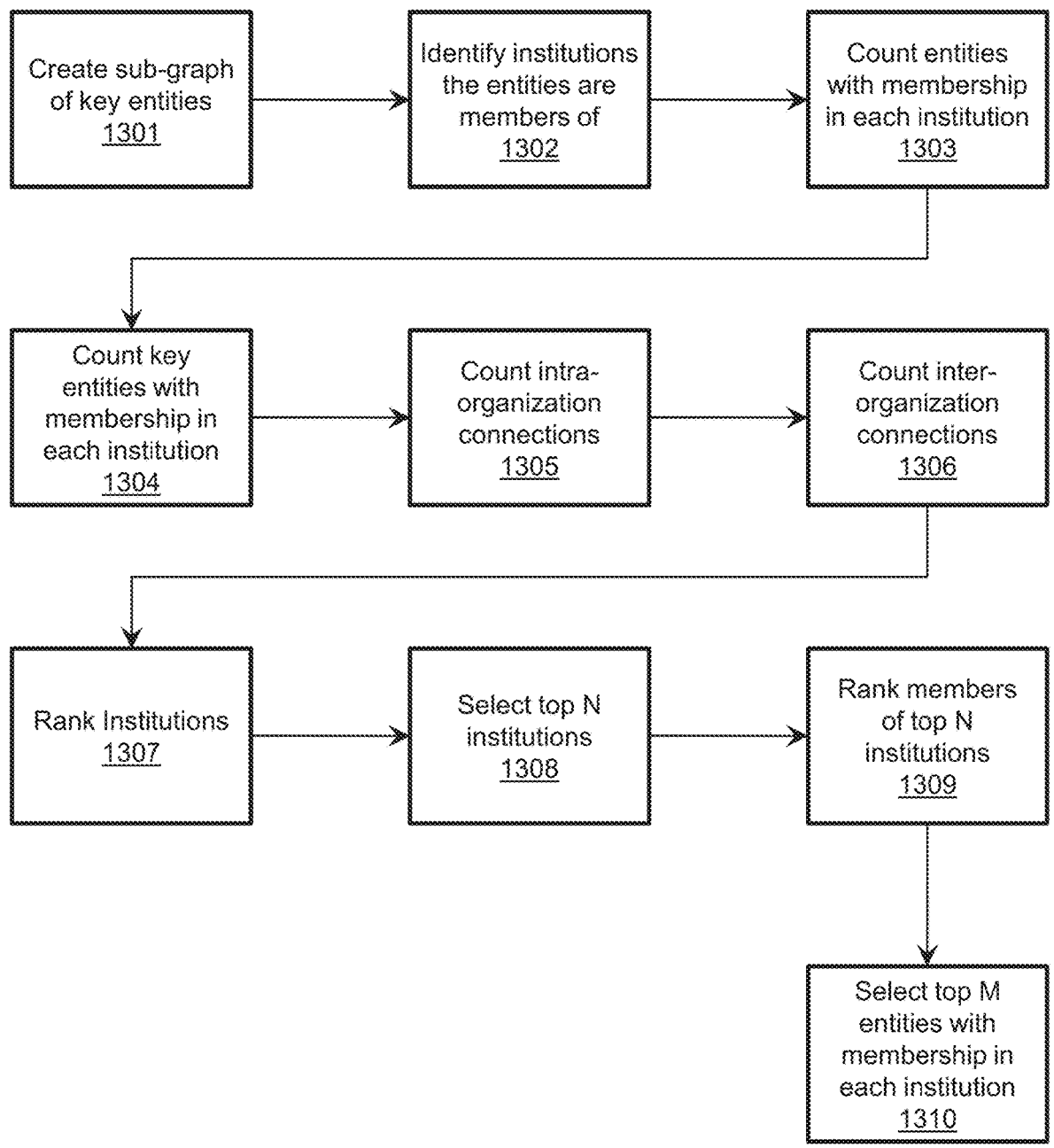
FIG. 15 is an example flow diagram of identifying centers of significance and identifying key entities within them.

FIG. 15 illustrates a conceptual flow chart for identifying centers of significance. First a subgraph of key entities is identified as in FIG. 1 (1301). Once the key entities are obtained, the institutions they belong to are collected (1302). The number of entities (both key entities and other entities in the giant component of the network) belonging to each institution are counted (1303, 1304). For each entity, the number of connections to other entities with the same institutional membership and to entities with other memberships is counted (1305, 1306). This data is used to form rankings of the institution based on the frequency of internal and external connections (1307). The institutions with the largest number of external and external connections are selected (1308) according to a formula. Finally, the member entities of each center of significance are ranked to determine the top members (1309) and selected as key entities (1310).

Figure 16:
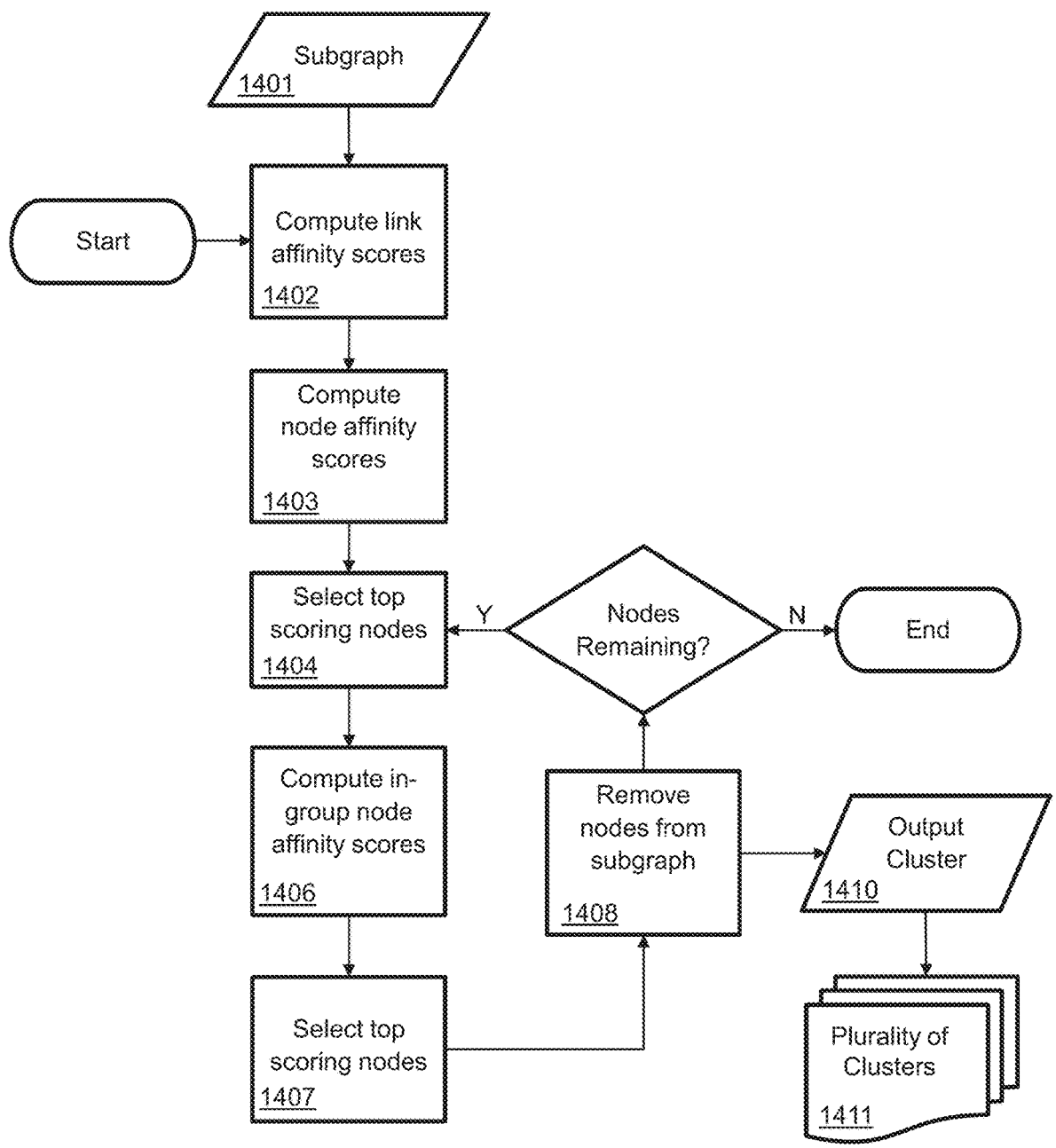
FIG. 16 is an example process flow for the method of dividing the subgraph up into clusters of entities.

FIG. 16 shows a conceptual process flow for dividing the subgraph (1401) into clusters of interconnected entities. First the affinity scores for each link in the subgraph are computed (1402). The affinity scores may be computed based on factors including the number of collaborations between entities in the subgraph, the age of collaborations, and the frequency of collaboration among other connections. The affinity scores assign a weight to each link in the graph. The total affinity scores for each entity are then computed by summing all the affinity scores on all of the links (1403). Thus, people with frequent collaborations with many other entities will tend to have the highest total affinity scores. The top ranking people are then selected (1404) according to some selection criteria, such as a threshold or a fixed number of the top ranking entities. This subgroup is then refined to the entities within it who collaborate with each other, following a similar process: The in-group affinity scores are then computed by summing only the scores connecting the nodes in the subgroup with other entities in the subgroup (1406). Then the top scoring entities are determined, again using a threshold or fixed number of entities (1407). This cluster (1410) is then extracted from the subgraph (1408) and added to a plurality of clusters (1411) which the subgraph is being divided into. The process is then repeated on the remaining subgraph until there are no nodes remaining. In this way, the graph is divided into clusters of frequently collaborating entities.

The computing device (1002) receives data about the network, including data about entities within the network, and in turn, the subgraph segmentation program (1100) produces one or more subgraph segments by executing some or all of the method steps described above in connection with FIG. 2. More specifically, the subgraph segmentation program (1100) includes instructions executable by the processor (1006) for causing the computing device (1002) to perform some or all of the steps described above in connection with FIG. 2.

It is noted that the computing device (1002) may be configured to store both the subgraph generation and subgraph segmentation programs (1010, 1100) in memory (1008), and that the functions of each program (1010, 1100) may be combined into a single program, or that the programs (1010, 1100) may be executed together in a cooperative manner.

The functionality of the systems, devices, and their respective components, as well as the method steps and blocks described herein may be implemented in hardware, software, firmware, or any suitable combination thereof. The software/firmware may be a program having sets of instructions (e.g., code segments) executable by one or more digital circuits, such as microprocessors, DSPs, embedded controllers, or intellectual property (IP) cores. If implemented in software/firmware, the functions may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable medium.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework. Those of ordinary skill in the related art will appreciate that interfaces may include one or more GUI's, CLI's or a combination thereof.

A processor may include a commercially available processor such as a Celeron, Core, or Pentium processor made by Intel Corporation, a SPARC processor made by Sun Microsystems, an Athlon, Sempron, Phenom, or Opteron processor made by AMC Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an Internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. In a non-transitory computer-readable medium, a method of generating a subgraph of key entities in a network, segmenting the subgraph of key entities of a network into subgroups based on network centrality metrics, and identifying entities which span the subgroups, the method comprising:
  a. generating the subgraph of key entities, comprising:
    i. determining, by executing at least one computer program on one or more processors to determine at least two independent types of network centrality metrics for a plurality of entities in a giant component of the network;
    ii. selecting starting cut-off criteria for each network centrality metric;
    iii. assigning a plurality of rank-based scores to each entity, where each rank based score corresponds to each network centrality metric value of each entity;
    iv. selecting some of the entities to form a tentative subgraph of key entities, wherein a subgraph of key entities is defined as a social network graph of a group of entities within the giant component of the network, where the selection of key entities is based on comparisons of the plurality of rank-based scores to the plurality of cut-off criteria, the selection process comprising:
      1. identifying the entities whose centrality metric score for a network centrality metric exceeds the cut-off criteria;
      2. merging the identified entities into the tentative subgraph; and
      3. iteratively repeating steps 1 and 2 of the selection process for each network centrality metric;
    v. calculating reach of the entities in the tentative subgraph of key entities and comparing the reach to a reach range, wherein the reach is defined a[s] a fraction of entities in the giant component which are connected to the entities in the tentative subgraph by first-degree links, second-degree links or a combination thereof; wherein the first-degree and second-degree links are based upon co-authorships, co-citations, cross-institutional relationships, or a combination thereof, and where the reach range is defined by a minimum and a maximum reach threshold;
    vi. if the reach falls within the reach range, defined as falling above the minimum reach threshold and below the maximum reach threshold, assigning the entities in the tentative sub graph of key entities to the subgraph of key entities, wherein the subgraph of key entities represents a core group of key opinion leaders within a social network;
    vii. if the reach does not fall within the reach range, independently adjusting one or more of the cut-off criteria for each network centrality metric; and
    viii. iteratively repeating steps iii-vii of the generating the subgraph of key entities until the subgraph of key entities with a reach within the reach range is formed;
  b. segmenting the subgraph into subgroups, comprising:
    i. calculating, by executing at least one computer program on one or more processors to calculate at least two independent network centrality metric values for each entity in the sub graph of key entities, wherein the network centrality metrics quantitatively indicate independent characteristics of an entity in the network;
    ii. assigning a plurality of rank-based scores to each entity, where each rank based score corresponds to each network centrality metric value of each entity;
    iii. defining a plurality of rank-based score ranges for each of the network centrality metrics;
    iv. defining a plurality of subgroups corresponding to combinations of the rank based score ranges;
    v. assigning each entity of the sub graph of key entities to one or more subgroups, comprising:
      1. for each rank based score range, determining the score range that the entity's rank-based score falls into;
      2. for each subgroup, determining if the entity's rank-based scores fall within the score ranges corresponding to the subgroup;
      3. assigning the entity to the corresponding subgroup; and
      4. if the entity falls within more than one subgroup, optionally removing the entity from one or more of the subgroups; and vi. repeating steps iii-v of the segmenting the subgraph into subgroups until a predetermined number of entities is assigned to each subgroup; and c. identifying a plurality of entities which span the subgroups, comprising:
   i. for each entity in each subgroup, determining the shortest path through the network to each entity in each of the other subgroups, resulting in an array of connection paths for each entity;
   ii. counting the number of first and second degree connections to members of other subgroups each entity has, wherein a first degree connection is a single-link relationship between an entity and another entity in a different subgroup, wherein a second degree connection is a two-link relationship between an entity and another entity in a different subgroup, resulting in a bridging connection count for each entity; and
   iii. selecting a plurality of entities with the highest bridging connection counts.

2. In a non-transitory computer-readable medium, a method of generating a subgraph of key entities in a network, and centers of significance within the network, the method comprising:

a. generating the subgraph of key entities, comprising:
   i. determining, by executing at least one computer program on one or more processors to determine at least two independent types of network centrality metrics for a plurality of entities in a giant component of the network;
   ii. selecting starting cut-off criteria for each network centrality metric;
   iii. assigning a plurality of rank-based scores to each entity, where each rank based score corresponds to each network centrality metric value of each entity;
   iv. selecting some of the entities to form a tentative subgraph of key entities, wherein a sub graph of key entities is defined as a social network graph of a group of entities within the giant component of the network, where the selection of key entities is based on comparisons of the plurality of rank-based scores to the plurality of cut-off criteria, the selection process comprising:
      1. identifying the entities whose centrality metric score for a network centrality metric exceeds the cut-off criteria;
      2. merging the identified entities into the tentative sub graph; and
      3. iteratively repeating steps 1 and 2 of the selection process for each network centrality metric;
   v. calculating reach of the entities in the tentative sub graph of key entities and comparing the reach to a reach range, wherein the reach is defined as a fraction of entities in the giant component which are connected to the entities in the tentative subgraph by first-degree links, second-degree links or a combination thereof, wherein the first-degree and second-degree links are based upon co-authorships, co-citations, cross-institutional relationships, or a combination thereof, and where the reach range is defined by a minimum and a maximum reach threshold;
   vi. if the reach falls within the reach range, defined as falling above the minimum reach threshold and below the maximum reach threshold, assigning the entities in the tentative sub graph of key entities to the subgraph of key entities, wherein the subgraph of key entities represents a core group of key opinion leaders within a social network;
   vii. if the reach does not fall within the reach range, independently adjusting one or more of the cut-off criteria for each network centrality metric; and
   viii. iteratively repeating steps iii-vii of the generating the subgraph of key entities until the subgraph of key entities with a reach within the reach range is formed;

b. identifying centers of significance within a network, wherein a center of significance is an organization with a high degree of influence, comprising:
   i. for each entity in the network, identifying a list of organizations to which the entity belongs;
   ii. for each entity in the subgraph of key entities, identifying a list of organizations to which the entity belongs;
   iii. counting the number of entities with a membership in each organization;
   iv. counting the number of key entities with a membership in each organization;
   v. for each organization, counting the number of connections between entities with a membership in the organization;
   vi. for each organization, counting the number of connections between members and non-members of the organization;
   vii. ranking the organizations according to a formula based on the number of entities and key entities belonging to the organization, and the number of connections within and outside the organization; and
   viii. selecting a plurality of the highest ranking organizations; and c. identifying entities which are important within each center of significance, comprising:
   i. for each entity with a membership in each center of significance:
      1. counting the number of connections to other entities with a membership in the center of significance; and
      2. counting the number of connections to entities who are not members of the center of significance;
   ii. ranking the entities according to a formula based on the number of connections within the center of significance and outside the center of significance; and
   iii. selecting a plurality of entities with the highest rank.

* * * * *